(12) United States Patent
Lim et al.

(10) Patent No.: US 11,139,507 B2
(45) Date of Patent: Oct. 5, 2021

(54) ELECTROLYTE FOR LITHIUM SECONDARY BATTERY AND LITHIUM SECONDARY BATTERY INCLUDING THE SAME

(71) Applicant: LG Chem, Ltd., Seoul (KR)

(72) Inventors: Young Min Lim, Daejeon (KR); Chul Haeng Lee, Daejeon (KR); Kyung Mi Lee, Daejeon (KR)

(73) Assignee: LG Chem, Ltd.

( * ) Notice: Subject to any disclaimer, the term of this patent is extended or adjusted under 35 U.S.C. 154(b) by 33 days.

(21) Appl. No.: 16/462,405

(22) PCT Filed: Mar. 16, 2018

(86) PCT No.: PCT/KR2018/003136
§ 371 (c)(1),
(2) Date: May 20, 2019

(87) PCT Pub. No.: WO2018/169371
PCT Pub. Date: Sep. 20, 2018

(65) Prior Publication Data
US 2019/0356021 A1    Nov. 21, 2019

(30) Foreign Application Priority Data

Mar. 17, 2017   (KR) .................. 10-2017-0034039

(51) Int. Cl.
*H01M 10/0567* (2010.01)
*C07F 5/02* (2006.01)
*H01M 10/0525* (2010.01)
*H01M 10/0568* (2010.01)

(52) U.S. Cl.
CPC ......... *H01M 10/0567* (2013.01); *C07F 5/022* (2013.01); *H01M 10/0525* (2013.01); *H01M 10/0568* (2013.01); H01M 2300/0025 (2013.01)

(58) Field of Classification Search
CPC combination set(s) only.
See application file for complete search history.

(56) References Cited

U.S. PATENT DOCUMENTS

| 2008/0118845 A1 | 5/2008 | Ihara et al. |
| 2014/0113202 A1 | 4/2014 | Sun et al. |
| 2014/0272605 A1 | 9/2014 | Lim et al. |
| 2015/0140446 A1 | 5/2015 | Li |
| 2016/0028116 A1 | 1/2016 | Ahn et al. |
| 2017/0309961 A1 | 10/2017 | Lim et al. |

FOREIGN PATENT DOCUMENTS

| JP | 2008127356 A | 6/2008 |
| KR | 101586139 B1 | 1/2016 |
| KR | 20160036810 A | 4/2016 |
| KR | 20160036811 A | 4/2016 |
| KR | 20160036812 A | 4/2016 |
| KR | 101702406 B1 | 2/2017 |
| WO | 2015073419 A1 | 5/2015 |

OTHER PUBLICATIONS

International Search Report for Application No. PCT/KR2018/003136 dated Oct. 29, 2018.
Extended European Search Report including Written Opinion for Application No. EP18767873.5 dated Sep. 25, 2019.

*Primary Examiner* — Ladan Mohaddes
(74) *Attorney, Agent, or Firm* — Lerner, David, Littenberg, Krumholz & Mentlik, LLP

(57) ABSTRACT

An electrolyte for a lithium secondary battery of the present invention may improve high-rate charge and discharge characteristics and high-temperature storage and life characteristics of a lithium secondary battery and may achieve an effect of increasing reversible capacity by simultaneously including lithium bis(fluorosulfonyl)imide (LiFSI) and a second lithium salt, as a lithium salt, while including a second additive as well as a novel borate-based lithium compound, as an additive.

10 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATIONS

This application claims the benefit of Korean Patent Application No. 2017-0034039, filed on Mar. 17, 2017, in the Korean Intellectual Property Office, the disclosure of which is incorporated herein in its entirety by reference.

TECHNICAL FIELD

The present invention relates to an electrolyte for a lithium secondary battery, which may improve performance of the battery, and a lithium secondary battery including the same.

BACKGROUND ART

As the miniaturization and weight reduction of electronic devices are realized and the use of portable electronic devices is common, research into secondary batteries having high energy density, as power sources of these devices, has been actively conducted.

The secondary battery includes a nickel-cadmium battery, a nickel-metal hydride battery, a nickel-hydrogen battery, and a lithium secondary battery, and, among these batteries, research into lithium secondary batteries, which not only exhibit a discharge voltage two times or more higher than a typical battery using an aqueous alkaline solution, but also have high energy density per unit weight and are rapidly chargeable, has been emerged.

A lithium metal oxide is used as a positive electrode active material of a lithium secondary battery, and lithium metal, a lithium alloy, crystalline or amorphous carbon, or a carbon composite is used as a negative electrode active material. A current collector is coated with the active material of appropriate thickness and length or the active material itself is coated in the form of a film, and the resultant product is then wound or stacked with an insulating separator to prepare electrodes. Thereafter, the electrodes are put into a can or a container similar thereto, and a secondary battery is then prepared by injecting an electrolyte.

Charge and discharge of the lithium secondary battery is performed while a process of intercalating and deintercalating lithium ions from a lithium metal oxide positive electrode into and out of a graphite negative electrode is repeated. In this case, since lithium is highly reactive, the lithium reacts with the carbon electrode to form $Li_2CO_3$, LiO, or LiOH, and thus, a film may be formed on the surface of the negative electrode. The film is referred to as "solid electrolyte interface (SEI)", wherein the SEI formed at an initial stage of charging may prevent a reaction of the lithium ions with the carbon negative electrode or other materials during charge and discharge. Also, the SEI only passes the lithium ions by acting as an ion tunnel. The ion tunnel may prevent the collapse of a structure of the carbon negative electrode due to the co-intercalation of the carbon negative electrode and organic solvents of the electrolyte having a high molecular weight which solvates the lithium ions and moves therewith.

Thus, in order to improve high-temperature cycle characteristics and low-temperature output of the lithium secondary battery, a robust SEI must be formed on the negative electrode of the lithium secondary battery. Once the SEI is formed during initial charge, the SEI may prevent the reaction of the lithium ions with the negative electrode or other materials during repeated charge and discharge caused by the subsequent use of the battery and may act as an ion tunnel that only passes the lithium ions between the electrolyte and the negative electrode.

Conventionally, with respect to an electrolyte which does not include an electrolyte additive or includes an electrolyte additive having poor characteristics, it was difficult to expect the improvement of low-temperature output characteristics due to the formation of a non-uniform SEI. Furthermore, even in a case in which the electrolyte additive is included, since the surface of the positive electrode is decomposed or the electrolyte causes an oxidation reaction during a high-temperature reaction due to the electrolyte additive when an amount of the electrolyte additive added may not be adjusted to the required amount, irreversible capacity of the secondary battery may ultimately be increased and output characteristics may be reduced.

Thus, there is a need to develop a compound which may be used as an electrolyte additive for improving overall performance, such as high-rate charge and discharge characteristics, high-temperature performance characteristics, and life characteristics, of the battery by forming a robust SEI on the negative electrode.

DISCLOSURE OF THE INVENTION

Technical Problem

An aspect of the present invention provides an electrolyte for a lithium secondary battery which includes a novel electrolyte additive for improving high-rate charge and discharge characteristics, suppressing an amount of gas generated during high-temperature storage, and improving life characteristics, and an electrolyte which may improve the above-described performance of a lithium secondary battery by including a lithium salt capable of having a synergistic effect on performance improvement when used together.

Technical Solution

According to an aspect of the present invention, there is provided an electrolyte for a lithium secondary battery which includes: a lithium salt including lithium bis(fluorosulfonyl)imide (LiFSI) and a second lithium salt; an additive composition including a borate-based lithium compound represented by Formula 1 and a second additive; and a non-aqueous organic solvent, wherein the second additive includes at least one selected from the group consisting of a lithiated additive and a non-lithiated additive, and the additive composition does not contain a non-lithiated phosphate compound.

[Formula 1]

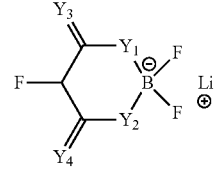

In Formula 1, $Y_1$ to $Y_4$ are each independently oxygen (O) or sulfur (S).

Advantageous Effects

An electrolyte additive composition of the present invention may improve high-rate charge and discharge characteristics of a lithium secondary battery, may suppress an amount of gas generated during high-temperature storage, and may improve life characteristics, due to a synergistic effect of a novel electrolyte additive and an additive mixed therewith.

MODE FOR CARRYING OUT THE INVENTION

Hereinafter, preferred embodiments of the present invention will be described in more detail. It will be understood that words or terms used in the specification and claims shall not be interpreted as the meaning defined in commonly used dictionaries, and it will be further understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

Accordingly, since configurations illustrated in examples described in the specification are merely the most exemplary embodiments of the present invention and do not represent the entire technical idea of the present invention, it should be understood that there may be various equivalents and modifications capable of replacing them at the time of application.

Electrolyte for Lithium Secondary Battery

According to the present specification, an electrolyte for a lithium secondary battery including a novel electrolyte additive is provided, and the electrolyte includes a lithium salt including lithium bis(fluorosulfonyl)imide (LiFSI) and a second lithium salt; an additive composition including a borate-based lithium compound represented by Formula 1 and a second additive; and a non-aqueous organic solvent, wherein the second additive includes at least one selected from the group consisting of a lithiated additive and a non-lithiated additive, and the additive composition does not contain a non-lithiated phosphate compound.

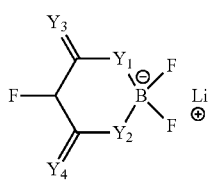

[Formula 1]

In Formula 1, $Y_1$ to $Y_4$ are each independently oxygen (O) or sulfur (S).

1) Borate-Based Lithium Compound (Electrolyte Additive)

According to the present specification, a borate-based lithium compound represented by the following Formula 1 is included as an additive in the electrolyte for a lithium secondary battery.

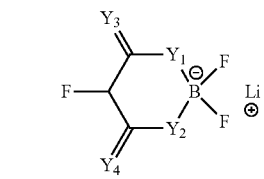

[Formula 1]

In Formula 1, $Y_1$ to $Y_4$ are each independently O or S. Preferably, $Y_1$ to $Y_4$ may be equally O.

The borate-based lithium compound may be included as an additive in an electrolyte, wherein the borate-based lithium compound forms uniform and thin films on a positive electrode and a negative electrode, and, particularly, the borate-based lithium compound may improve durability of a battery by mainly forming a positive electrode solid electrolyte interface (SEI) to reduce a positive electrode reaction of other materials and thus forming a uniform and thin film. Also, the borate-based lithium compound may form a robust SEI on a surface of the negative electrode during the operation of the battery, and high-rate charge and discharge characteristics of the battery may be improved due to the interface robustly formed as described above.

As a specific example, the borate-based lithium compound as described above may include a compound represented by the following Formula 1a.

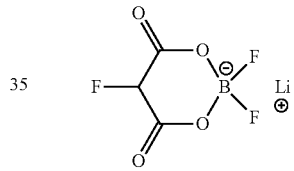

[Formula 1a]

The borate-based lithium compound may be appropriately used according to an amount of the electrolyte additive generally added to the electrolyte, and, for example, may be used in an amount of about 0.01 part by weight to about 2 parts by weight, preferably 0.01 part by weight to 0.5 part by weight or 0.1 part by weight to 2 parts by weight, and more preferably 0.5 part by weight to 1 part by weight based on 100 parts by weight of a total weight of the electrolyte. In a case in which the borate-based lithium compound is used in an amount within the above range, a robust SEI may be stably formed on the negative electrode as described above, and the resulting effect may be obtained.

2) Lithium Salt

According to the present specification, the lithium salt includes an imide-based lithium salt and a second lithium salt.

Since the imide-based lithium salt is added as a lithium salt to the electrolyte to form a robust and thin SEI on the negative electrode, the imide-based lithium salt may not only improve low-temperature output characteristics, but also may suppress decomposition of a surface of the positive electrode, which may occur during high-temperature cycles, and may prevent an oxidation reaction of an electrolyte solution. Furthermore, since the SEI formed on the negative electrode is thin, movement of lithium ions in the negative electrode is facilitated, and, accordingly, output of the secondary battery may be improved.

The imide-based lithium salt may include lithium bis(fluorosulfonyl)imide (LiFSI), and the fluoro (F) may be substituted with chlorine (Cl), but the imide-based lithium salt may be preferably lithium bis(fluorosulfonyl)imide.

The imide-based lithium salt may have a concentration in the electrolyte of 0.01 mole/l to 2 mole/l, for example, 0.01 mole/l to 1 mole/l. In a case in which the concentration of the imide-based lithium salt is less than 0.01 mole/l, effects of improving low-temperature output characteristics and high-temperature cycle characteristics of the lithium secondary battery are insignificant, and, in a case in which the concentration of the imide-based lithium salt is greater than 2 mole/l, since a side reaction in the electrolyte may excessively occur during charge and discharge of the battery, a swelling phenomenon may occur and corrosion of a positive electrode collector or negative electrode collector formed of a metal may occur in the electrolyte solution.

In order to prevent the side reaction, the lithium salt may further include a second lithium salt in addition to the imide-based lithium salt. A lithium salt typically used in the art may be used as the second lithium salt, and, for example, the second lithium salt may include any one selected from the group consisting of $LiPF_6$, $LiAsF_6$, $LiCF_3SO_3$, $LiBF_6$, $LiSbF_6$, $LiN(C_2F_5SO_2)_2$, $LiAlO_4$, $LiAlCl_4$, $LiSO_3CF_3$, and $LiClO_4$, or a mixture of two or more thereof.

A mixing ratio of the imide-based lithium salt to the second lithium salt may be in a range of 1:0.01 to 1:9, for example, 1:0.01 to 1:5 as a molar ratio. If the mixing ratio of the imide-based lithium salt to the second lithium salt is within the above range of the molar ratio, since the side reaction in the electrolyte may be prevented during the charge and discharge of the battery, the swelling phenomenon may be significantly reduced, the output of the prepared lithium secondary battery may be improved, and stability of the secondary battery may be improved by suppressing the corrosion of the electrode current collector.

Specifically, in a case in which the mixing ratio of the imide-based lithium salt to the second lithium salt is less than 1:0.01 as a molar ratio (when the second lithium salt is less than 0.01 times the imide-based lithium salt), a large amount of irreversible reactions may occur during a process of forming the SEI in the lithium-ion battery and a process of intercalating lithium ions, which are solvated by a carbonate-based solvent, into the negative electrode, and the effects of improving low-temperature output as well as cycle characteristics and capacity characteristics after high-temperature storage of the secondary battery may be insignificant due to the exfoliation of a negative electrode surface layer (e.g., carbon surface layer) and the decomposition of the electrolyte solution.

With respect to the second lithium salt, the materials exemplified above may be used, but it is most preferred to use $LiPF_6$ in consideration of the interaction with the imide-based lithium salt. In a case in which the $LiPF_6$ is used together, since disadvantages of the $LiPF_6$, in which performance is excellent but the side reaction with the solvent is active, may be complemented while taking advantages of the imide-based lithium salt, the swelling phenomenon may be suppressed due to the prevention of the side reaction, and performance, such as low-temperature output, may be improved.

The above-described lithium salt including the imide-based lithium salt and the second lithium salt is a material capable of complementing the above-described borate-based lithium compound represented by Formula 1, wherein, upon activation, the borate-based lithium compound may first form the SEI of a negative electrode inorganic component to improve conductivity of lithium cation and form a film having excellent durability, but there is a limitation in that it is difficult to obtain the above-described effect by using a single material. However, since the imide-based lithium salt capable of significantly contributing to the formation of the negative electrode interface is combined therewith as described above, overall performance, such as high-rate charge and discharge characteristics, high-temperature storage characteristics, and life characteristics, of the lithium secondary battery may be improved by stabilizing the SEIs on the positive electrode and the negative electrode.

Specifically, since the film is stably formed as described above, a side reaction, for example, the decomposition of the solvent in the electrolyte around the electrode, may be suppressed. Accordingly, the amount of gas generated may be significantly reduced even if the lithium secondary battery is stored for a long period of time in a high-temperature atmosphere, and life performance may also be improved due to the improvement of the storage characteristics.

Furthermore, since the borate-based lithium compound may be stable without being decomposed at high temperature, there is no side reaction, for example, the decomposition of the surface of the positive electrode or oxidation of the electrolyte. Thus, an increase in irreversible capacity of the battery may be prevented, and accordingly, an effect of increasing reversible capacity may be obtained.

3) Non-Aqueous Organic Solvent

In the non-aqueous electrolyte according to the present specification, the non-aqueous organic solvent may include any kind of organic solvent which may be used as a non-aqueous electrolyte during the preparation of a typical lithium secondary battery. In this case, the amount thereof may be appropriately changed within a normally usable range.

Specifically, the non-aqueous organic solvent may include conventional organic solvents, which may be used as a non-aqueous organic solvent of a lithium secondary battery, such as a cyclic carbonate solvent, a linear carbonate solvent, an ester solvent, or a ketone solvent, and one alone or a mixture of two or more thereof may be used.

The cyclic carbonate solvent may include one selected from the group consisting of ethylene carbonate (EC), propylene carbonate (PC), vinylene carbonate (VC), fluoroethylene carbonate (FEC), and butylene carbonate (BC), or a mixed solution of two or more thereof.

Also, the linear carbonate solvent may include one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixed solution of two or more thereof.

Furthermore, the ester solvent may include one selected from the group consisting of methyl acetate, ethyl acetate, propyl acetate, methyl propionate, ethyl propionate, γ-butyrolactone, γ-valerolactone, γ-caprolactone, δ-valerolactone, and ε-caprolactone, or a mixed solution of two or more thereof. Also, poly(methyl vinyl ketone) may be used as the ketone solvent.

In addition, a mixed organic solvent, in which 3 kinds of carbonate-based solvents are mixed, may be used as the non-aqueous organic solvent, and, it is more desirable to use a ternary non-aqueous organic solvent. Examples of the compound, which may be used in the mixing, may be ethylene carbonate, propylene carbonate, butylene carbonate, dimethyl carbonate, diethyl carbonate, dipropyl carbonate, ethylmethyl carbonate, vinylene carbonate, fluoroethylene carbonate, methylpropyl carbonate, or ethylpropyl carbonate, and a mixed solvent, in which 3 kinds selected from the above carbonate compounds are mixed, may be used.

4) Other Additives

According to the present specification, it is desirable not to include a phosphate compound as the electrolyte additive. For example, the phosphate compound may be represented by Formula 2 below.

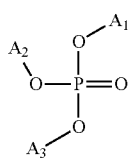

[Formula 2]

In Formula 2, $A_1$ to $A_3$ are each independently —Si$(R_1)_n(R_2)_{3-n}$, or a propynyl group (—C≡C), wherein $R_1$ and $R_2$ are each independently an alkyl group having 1 to 4 carbon atoms, and n is an integer of 0 to 3.

As the phosphate compound, for example, tris(trimethylsilyl) phosphate, tris(triethylsilyl) phosphate, tris(tripropylsilyl) phosphate, bis(trimethylsilyl)(triethylsilyl) phosphate, bis(triethylsilyl)(trimethylsilyl) phosphate, bis(tripropylsilyl)(trimethylsilyl) phosphate, and bis(tridimethylsilyl)(tripropylsilyl) phosphate may be used, and the compound, in which alkyl groups of each silyl group are different from each other, may be used.

Also, dipropynyl ethyl phosphate or diethyl propynyl phosphate may also be used as the phosphate compound.

The phosphate compound as described above may have a significantly adverse effect on aging characteristics of the electrolyte itself, and there is a concern that it may interfere with the synergistic effect of the borate-based lithium compound and a non-lithiated additive in addition to the adverse effect on the aging characteristics. Thus, it is desirable not to include the phosphate compound in terms of improving high-temperature performance of the battery, and, particularly, it is desirable not to include tributyl phosphate or tris(trimethylsilyl) phosphate.

According to the present specification, a second additive may be further included as the electrolyte additive in addition to the borate-based lithium compound, and the second additive includes a lithiated additive and/or a non-lithiated additive. With respect to the second additive, a weight ratio of the borate-based lithium compound to the second additive may be in a range of 1:0.01 to 1:5, preferably 1:0.05 to 1:2, and more preferably 1:0.1 to 1:1, and the weight ratio may be different depending on types of the additives added.

The non-lithiated additive is a compound capable of providing the synergistic effect with the borate-based lithium compound as described above on the improvement in performance of the lithium secondary battery, wherein any additive may be used as long as it, as an additive generally used in a non-aqueous electrolyte of a lithium secondary battery, is an additive not in the form of a lithium salt.

Preferred examples of the non-lithiated additive may be a carbonate compound, a borate compound, a vinyl silane compound, a sulfur-containing compound, a nitrile compound, or a fluorobenzene compound, and a mixture of two or more thereof may be used.

A relative amount of the non-lithiated additive with respect to the above-described borate-based lithium compound is not particularly limited, but, in a case in which the non-lithiated additive is included in the electrolyte, the non-lithiated additive may be used in an amount of about 0.01 part by weight to about 10 parts by weight, preferably 0.01 part by weight to 5 parts by weight or 0.1 part by weight to 10 parts by weight, and more preferably 0.1 part by weight to 5 parts by weight based on 100 parts by weight of the total weight of the electrolyte, and, in a case in which the above-described weight ratio is satisfied and the above-described amount of the non-lithiated additive is added, the desired effect may be achieved.

Hereinafter, specific examples of the compounds, which may be used as the above-described non-lithiated additive, will be described, but the present invention is not limited thereto, and any compound may be used as long as it is a compound having typical characteristics, such as carbonate-based and borate compounds, while complementing the performance improvement effect of the borate-based lithium compound represented by Formula 1.

As the carbonate compound, vinylene carbonate, fluoroethylene carbonate, difluoroethylene carbonate, or vinyl ethylene carbonate, for example, may be used, and the compound may be substituted with a substituent such as an alkyl group having 1 to 3 carbon atoms.

The carbonate compound forms a SEI mainly on the negative electrode during battery activation, but, since the SEI is thick and unstable at high temperature, durability of the battery may be improved by mixed use of the carbonate compound and the lithium compound represented by Formula 1 which forms a SEI on the negative electrode earlier than the carbonate compound. Fluoroethylene carbonate, difluoroethylene carbonate, or vinyl ethylene carbonate may be preferably used, and, in this case, improvements of high-temperature storage performance and high-temperature life characteristics may be expected.

In a case in which the carbonate compound is included in the electrolyte, the carbonate compound may be used in an amount of about 0.01 part by weight to about 10 parts by weight, preferably 0.01 part by weight to 5 parts by weight or 0.1 part by weight to 10 parts by weight, and more preferably 0.1 part by weight to 5 parts by weight based on 100 parts by weight of the total weight of the electrolyte, in order to optimize the achievement of the above-described effect. The carbonate compound may be included in a weight ratio of 1:0.5 to 1:6, for example, 1:1 to 1:4 with respect to the borate-based lithium compound within the above amount range.

As the vinyl silane compound, trialkylvinyl silane in which the alkyl has a carbon number of 1 to 4, dialkyldivinyl silane, alkyltrivinyl silane, and tetravinyl silane may be used.

Since the vinyl silane compound forms a silicon (Si)-based SEI on the negative electrode, the vinyl silane compound may improve durability of the negative electrode of the battery by being mixed with the borate-based lithium compound represented by Formula 1.

In a case in which the vinyl silane compound is added, the vinyl silane compound may be added in a ratio of preferably 1:0.05 to 1:1, more preferably 1:0.05 to 1:0.5, and optimally 1:0.1 to 1:0.5.

The borate compound may be represented by Formula 3 below.

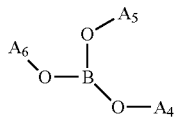

[Formula 3]

In Formula 3, $A_4$ to $A_6$ are each independently —Si$(R_3)_m(R_4)_{3-m}$, or a propynyl group (—C≡C), wherein $R_3$ and $R_4$ are each independently an alkyl group having 1 to 4 carbon atoms, and m is an integer of 0 to 3.

As the borate compound, for example, tris(trimethylsilyl) borate, tris(triethylsilyl) borate, tris(tripropylsilyl) borate, bis(trimethylsilyl)(triethylsilyl) borate, bis(triethylsilyl) (trimethylsilyl) borate, bis(tripropylsilyl)(trimethylsilyl) borate, and bis(tridimethylsilyl)(tripropylsilyl) borate may be used, and the compound, in which alkyl groups of each silyl group are different from each other, may be used.

Also, as the borate compound, dipropynyl ethyl borate or diethyl propynyl borate may be used.

Since the borate compound promotes ion-pair separation of a lithium salt, the borate compound may improve mobility of lithium ions, may reduce interfacial resistance of the SEI, and may dissociate a material, such as LiF, which may be formed during a battery reaction but is not well separated, and thus, a problem, such as generation of hydrofluoric acid gas, may be solved.

The nitrile compound is a compound represented by Formula 5 below.

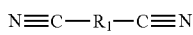

[Formula 5]

In Formula 5, $R_1$ is an alkylene group having 1 to 5 carbon atoms.

The nitrile compound is a compound containing two nitrile groups, wherein a linking group linking the two nitrile groups is an alkylene group and a carbon number may be in a range of 1 to 5, for example, 2 to 4.

The nitrile compound, in which the carbon number of the alkylene group, as a linking group, is in a range of 2 to 4, includes succinonitrile, glutaronitrile, or adiponitrile, and at least one of these compounds may be included as one component of the electrolyte additive composition. Among them, succinonitrile or adiponitrile may be preferably used.

The nitrile compound is a compound capable of providing a synergistic effect with the borate-based lithium compound as described above on the improvement in performance of the lithium secondary battery, wherein the nitrile compound, as an additive generally used in a non-aqueous electrolyte of a lithium secondary battery, may have an effect such as suppression of the dissolution of positive electrode transition metals, and, when it is used with the borate-based lithium compound, an effect, such as improvement of high-temperature characteristics, may be expected due to the stabilization of the positive electrode/negative electrode films.

That is, the nitrile compound may play a complementary role in forming the negative electrode SEI in addition to the effect induced by the borate-based lithium compound, may play a role in suppressing the decomposition of a solvent in the electrolyte, and may play a role in improving the mobility of lithium ions.

A weight ratio of the borate-based lithium compound to the nitrile compound may be in a range of 1:0.5 to 1:6, preferably 1:1 to 1:5, and more preferably 1:2 to 1:5.

In a case in which the ratio satisfies the above range, since a capacity retention at high temperature is improved and the amount of gas generated during high-temperature storage is suppressed, an improvement in high-temperature storage characteristics may be expected. That is, an electrolyte capable of satisfying both battery performance and storage characteristics at high temperature may be obtained by adjusting the weight ratio of the borate-based lithium compound to the nitrile compound, and obtainability may be higher as the ratio is within a preferred range among the above ranges.

The sulfur-containing compound may be represented by Formula 4 below.

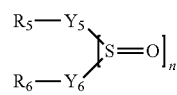

[Formula 4]

In Formula 4, $Y_5$ and $Y_6$ are each independently a direct bond, carbon (C), or O, $R_5$ and $R_6$ are each independently a substituted or unsubstituted alkyl group having 1 to 10 carbon atoms, a substituted or unsubstituted aryl group having 6 to 20 carbon atoms, or are linked together to form 4- to 7-membered rings, and n is 1 or 2.

In Formula 4, if n is 1, the number of S=O bonds is 1, $R_5$ and $R_6$ are linked together to form a ring, and simultaneously, when $Y_5$ and $Y_6$ are O, the compound may be a sulfite-based sulfur-containing compound. If n is 2, the number of S=O bonds is 2, $R_5$ and $R_6$ are linked together to form a ring, and simultaneously, when $Y_5$ and $Y_6$ are O, the compound may be a sulfate-based sulfur-containing compound, and, in the sulfate compounds, when any one of $Y_5$ and $Y_6$ is C, the compound may be a sultone-based sulfur-containing compound. Also, if n is 2, the number of S=O bonds is 2 and, when $R_5$ and $R_6$ do not form a ring, the compound may be a sulfone compound.

As a specific example, methylene sulfate, ethylene sulfate, trimethylene sulfate, tetramethylene sulfate, or sulfate having a substituent bonded to these alkylene groups may be used as the sulfate-based sulfur-containing compound, and methylene sulfite, ethylene sulfite, trimethylene sulfite, tetramethylene sulfite, or sulfite having a substituent bonded to these alkylene groups may be used as the sulfite-based sulfur-containing compound.

Also, as the sulfone-based sulfur-containing compound, dialkyl sulfone to which an alkyl group having 1 to 5 carbon atoms is bonded, diaryl sulfone to which an aryl group having to 12 carbon atoms is bonded, or sulfone having a substituent bonded to the alkyl or aryl may be used, and, as the sultone-based sulfur-containing compound, 1,3-propane sultone, 1,3-propene sultone, 1,4-butane sultone, 1,5-pentane sultone, or sultone having a substituent bonded to these alkylene groups may be used.

The sulfur-containing compounds may generally play a role in complementing the formation of the SEI on the surface of the negative electrode, and the sulfur-containing compounds may have an effect on high-temperature storage performance and high-rate charge and discharge characteristics by contributing the formation of stable SEI similar to the above-described borate-based lithium compound.

In a case in which the sulfur-containing compound is particularly a sulfate compound, a weight ratio may be in a range of preferably 1:0.1 to 1:2, more preferably 1:0.1 to 1:1.5, and optimally 1:0.5 to 1:1.5.

It is desirable that the nitrile compound, the vinyl silane compound, and the sulfur-containing compound (preferably, sulfate compound) are particularly included as the non-lithiated additive, and, in a case in which the non-lithiated additive is included in the above-described weight ratio, an excellent effect in improving both high-temperature performance and high-temperature storage characteristics may be obtained.

The lithiated additive is a compound capable of providing a synergistic effect with the borate-based lithium compound as described above on the improvement in performance of the lithium secondary battery, wherein the lithiated additive, as an additive generally used in a non-aqueous electrolyte of a lithium secondary battery, may be used as long as it is an additive in the form of a lithium salt.

With respect to the lithiated additive, a weight ratio of the borate-based lithium compound to the lithiated additive may be in a range of 1:0.05 to 1:2, preferably 1:0.1 to 1:2, more preferably 1:0.1 to 1:1.5, and optimally 1:0.1 to 1:1.

In a case in which the ratio satisfies the above range, since a capacity retention at high temperature is improved and the amount of gas generated during high-temperature storage is suppressed, an improvement in high-temperature storage characteristics may be expected. That is, an electrolyte capable of satisfying both battery performance and storage characteristics at high temperature may be obtained by adjusting the weight ratio of the borate-based lithium compound to the lithiated additive, and obtainability may be higher as the ratio is within a preferred range among the above ranges.

For example, any compound may be used as the lithiated additive as long as it is a compound having typical characteristics, such as boron halide-based, boron oxalate-based, phosphate-based, imidazole-based, or sulfate-based lithium, while complementing the performance improvement effect of the borate-based lithium compound represented by Formula 1.

For example, lithium tetrafluoro borate, lithium tetrachloro borate, lithium chlorotrifluoro borate, lithium trichlorofluoro borate, or lithium dichlorodifluoro borate may be used as the boron halide-based lithium.

Lithium bis(oxalato)borate, lithium difluoro(oxalato)borate, or lithium dichloro(oxalato)borate may be used as the boron oxalate-based lithium.

The boron-based lithium may be preferably the boron oxalate-based lithium, and, it is desirable to use lithium bis(oxalato)borate (LiBOB), lithium difluoro(oxalato)borate (LiODFB), or lithium dichloro(oxalato)borate (LiODCB) in consideration of the optimization of high-temperature storage characteristics and life characteristics.

For example, lithium dihalo phosphate, lithium dialkyl phosphate, lithium dihalo(bisoxalato) phosphate, and lithium dialkyl(bisoxalato) phosphate may be used as the phosphate-based lithium. In the names of the above compounds, the expression "dihalo", as two halogen substituents, may be each independently fluorine (F) or chlorine (Cl), and the expression "dialkyl", as two alkyl substituents, may be each independently an alkyl group having 1 to 3 carbon atoms.

The imidazole-based lithium may include lithium 4,5-dicyano-2-((halo)$_m$(alkyl)$_n$)imidazole, and in the compound name, the expression "halo", as a halogen substituent, may be each independently F or Cl, the expression "alkyl", as an alkyl substituent, may be each independently an alkyl group having 1 to 3 carbon atoms, m and n may be an integer of 1 to 3 and may satisfy m+n=4.

The sulfate-based lithium may include lithium alkyl sulfate, and in the compound name, the expression "alkyl", as an alkyl substituent, may be an alkyl group having 1 to 3 carbon atoms.

It is desirable to particularly use the boron oxalate-based lithium and the phosphate-based lithium as the lithiated additive, and, when these materials are included, the above-described effect may be more closely achieved.

Lithium Secondary Battery

According to the present specification, a lithium secondary battery including the above-described electrolyte for a lithium secondary battery may be provided, and the lithium secondary battery includes a positive electrode including a positive electrode active material, a negative electrode including a negative electrode active material, a separator disposed between the positive electrode and the negative electrode, and the above-described electrolyte.

The lithium secondary battery of the present invention may be prepared according to a typical method known in the art. For example, an electrolyte assembly is formed by sequentially stacking the positive electrode, the negative electrode, and the separator disposed between the positive electrode and the negative electrode, and the lithium secondary battery may be prepared by injecting an electrolyte in which a lithium salt is dissolved.

The positive electrode may be prepared by a typical method known in the art. For example, a binder, a conductive agent, and a dispersant, if necessary, as well as a solvent are mixed with a positive electrode active material and stirred to prepare a slurry, a metal current collector is then coated with the slurry and pressed, and the positive electrode may then be prepared by drying the coated metal current collector.

The positive electrode is prepared by a process of coating the positive electrode collector with the positive electrode active material and then drying the coated positive electrode collector. In this case, a lithium-containing transition metal oxide is preferably used as the positive electrode active material, and, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_{a-}Co_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $LixCo_{1-y}Mn_yO_2$ (0.5<x<1.3, 0≤y<1), $Li_xNi_{1-y}Mn_yO_2$ (0.5<x<1.3, 0<z<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3), or a mixture of two or more thereof may be used. Also, an active material having a high content of a specific transition metal, such as $xLi_2MO_3(1-x)LiMeO_2$ (where M is nickel (Ni), cobalt (Co), or manganese (Mn), Me is two or more transition metals selected from the group consisting of Ni, Co, Mn, chromium (Cr), iron (Fe), vanadium (V), aluminum (Al), magnesium (Mg), and titanium (Ti), and x satisfies 0<x<1), may be used.

The lithium-containing transition metal oxide may be coated with a metal, such as aluminum (Al), or a metal oxide. Also, in addition to the lithium-containing transition metal oxide, a sulfide, a selenide, or a halide may be used.

The positive electrode collector is generally formed to a thickness of 3 μm to 500 μm. The positive electrode collector is not particularly limited so long as it has conductivity without causing adverse chemical changes in the battery, and any metal may be used as long as it, as a metal with high conductivity as well as a metal to which the slurry of the positive electrode active material may be easily adhered, is not reactive in a voltage range of the battery. Non-limiting examples of the positive electrode collector may be aluminum, nickel, or a foil prepared by combination thereof.

The solvent used for forming the positive electrode may include an organic solvent, such as N-methylpyrrolidone (NMP), dimethylformamide (DMF), acetone, and dimethylacetamide, or water, and these solvents may be used alone or in a mixture of two or more thereof.

An amount of the solvent used may be sufficient if the solvent may dissolve and disperse the electrode active material, the binder, and the conductive agent in consideration of a coating thickness of the slurry and manufacturing yield.

The conductive agent may be used without limitation as long as it may be generally used in the art, and, for example, artificial graphite, natural graphite, carbon black, acetylene black, Ketjen black, Denka black, thermal black, channel black, carbon fibers, metal fibers, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, or a mixture thereof may be used.

The binder may be used without limitation as long as it is generally used in the art, and, for example, polyvinylidene fluoride (PVDF), a polyvinylidene fluoride-hexafluoropropylene copolymer (PVDF/HFP), poly(vinyl acetate), polyvinyl alcohol, polyethylene oxide, polyvinylpyrrolidone, polyvinylpyridine, alkylated polyethylene oxide, polyvinyl ether, poly(methyl methacrylate), poly(ethyl acrylate), polytetrafluoroethylene (PTFE), polyvinyl chloride, polyacrylonitrile, a styrene-butadiene rubber, an acrylonitrile-butadiene rubber, a fluoro rubber, an ethylene-propylene-diene monomer (EPDM), a sulfonated ethylene-propylene-diene monomer, carboxymethylcellulose (CMC), regenerated cellulose, starch, hydroxypropylcellulose, tetrafluoroethylene, or a mixture thereof may be used.

In the positive electrode, a filler may be further added to the mixture, if necessary. The filler, as a component that suppresses the expansion of the positive electrode, is selectively used, wherein the filler is not particularly limited as long as it is fibrous material while not causing chemical changes in the battery, and, for example, an olefin-based polymer such as polyethylene and polypropylene; and a fibrous material, such as glass fibers and carbon fibers, are used.

The negative electrode may be prepared by a typical method known in the art. For example, a binder, a conductive agent, and a dispersant, if necessary, as well as a solvent are mixed with a negative electrode active material and stirred to prepare a slurry, a metal current collector is then coated with the slurry and pressed, and the negative electrode may then be prepared by drying the coated metal current collector.

As the negative electrode active material, amorphous carbon or crystalline carbon may be included, and, specifically, carbon such as non-graphitizable carbon and graphite-based carbon; a complex metal oxide such as $Li_xFe_2O_3$ ($0 \leq x \leq 1$), $Li_xWO_2$ ($0 \leq x \leq 1$), $Sn_xMe_{1-x}Me'_yO_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; $0 < x \leq 1$; $1 \leq y \leq 3$; $1 \leq z \leq 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material, or a Li—Ti—O-based material may be used.

Those used in the positive electrode may be equally used as the binder and the conductive agent included in the negative electrode.

The negative electrode collector is generally formed to a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Both of a polyolefin-based polymer typically used in the art and a composite separator having an organic-inorganic composite layer formed on an olefin-based substrate may be used as the separator disposing between the positive electrode and the negative electrode and insulating these electrodes, but the separator is not particularly limited thereto.

The positive electrode, negative electrode, and separator, which have the above-described structure, are accommodated in a pouch case, and a pouch type battery may then be prepared by injecting the non-aqueous electrolyte, but the present invention is not limited thereto. A shape of the lithium secondary battery according to the present specification is not particularly limited, but a cylindrical type using a can or a prismatic type may be used, and a coin type may be used.

Examples

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

1. Borate-Based Lithium Compound and Non-Lithiated Additive 1

(1) Examples and Comparative Examples: Preparation of Electrolytes (Examples 1a to 8a and Comparative Examples 1a to 9a)

Electrolyte additive compositions were prepared by using materials and mixing weight ratios as listed in Table 1 below.

Subsequently, 0.7 mole/l of LiFSI and 0.3 mole/l of $LiPF_6$ were added to a non-aqueous organic solvent having a composition, in which propylene carbonate (PC): ethyl propionate (EP): dimethyl carbonate (DMC)=2:4:4 (weight ratio), based on a total amount of a non-aqueous electrolyte solution, and the electrolyte additive compositions were added in amounts as listed in Table 1 to prepare electrolytes of the examples and the comparative examples, respectively.

TABLE 1

| | Lithium salt | | Additive[1)2)] | | | | | Weight ratio | Total amount[1)] |
|---|---|---|---|---|---|---|---|---|---|
| | LiFSI | LiBF$_6$ | Formula 1a | SN | FEC | TBP | TMSP | | |
| Example 1a | 0.7M | 0.3M | 1.0 | 0.5 | | | | 1:0.5 | 1.5 |
| Example 2a | 0.7M | 0.3M | 1.0 | 1.0 | | | | 1:1 | 2 |
| Example 3a | 0.7M | 0.3M | 1.0 | 2.0 | | | | 1:2 | 3 |
| Example 4a | 0.7M | 0.3M | 1.0 | 3.0 | | | | 1:3 | 4 |
| Example 5a | 0.7M | 0.3M | 1.0 | 5.0 | | | | 1:5 | 6 |
| Example 6a | 0.7M | 0.3M | 1.0 | 6.0 | | | | 1:6 | 7 |
| Example 7a | 0.7M | 0.3M | 1.0 | 3.0 | 1.0 | | | 1:3:1 | 4 |
| Example 8a | 0.7M | 0.3M | 1.0 | 3.0 | 2.0 | | | 1:3:2 | 6 |
| Comparative Example 1a | 0.7M | 0.3M | 1.0 | | | 0.5 | | 1:0.5 | 1.5 |
| Comparative Example 2a | 0.7M | 0.3M | 1.0 | | | | 0.5 | 1:0.5 | 1.5 |
| Comparative Example 3a | 0.7M | 0.3M | 1.0 | 3.0 | | 0.5 | | 1:3:0.5 | 4.5 |
| Comparative Example 4a | 0.7M | 0.3M | 1.0 | 3.0 | | | 0.5 | 1:3:0.5 | 4.5 |
| Comparative Example 5a | 0.7M | 0.3M | 3.0 | | | | | — | 3.0 |
| Comparative Example 6a | 0.7M | 0.3M | | 1.0 | 2.0 | | | — | 3.0 |
| Comparative Example 7a | 0.7M | 0.3M | | 1.0 | 0.5 | | | — | 1.5 |
| Comparative Example 8a | 1.0M | — | 1.0 | 1.0 | | | | 1:1 | 2.0 |
| Comparative Example 9a | — | 1.0M | 1.0 | 1.0 | | | | 1:1 | 2.0 |

[1)]weight % based on a total weight of the electrolyte
[2)]SN: succinonitrile/FEC: fluoroethylene carbonate/TBP: tributyl phosphate/TMSP: tris(trimethylsilyl) phosphate

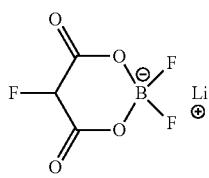

[Formula 1a]

(2) Experimental Example: Performance Evaluation of Lithium Secondary Battery

1) Preparation of Lithium Secondary Battery a mixture of 89 wt % of Li(Ni$_{0.33}$Co$_{0.33}$Mn$_{0.33}$)O$_2$ as a positive electrode active material, 8 wt % of carbon black as a conductive agent, and 3 wt % of polyvinylidene fluoride (PVDF), as a binder, were added to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry, dried, and then roll-pressed to prepare a positive electrode.

Also, 97 wt % of carbon powder as a negative electrode active material, 2 wt % of PVDF as a binder, and 1 wt % of carbon black, as a conductive agent, were added to NMP, as a solvent, to prepare a negative electrode mixture slurry. A 10 μm thick copper (Cu) thin film, as a negative electrode collector, was coated with the negative electrode mixture slurry, dried, and then roll-pressed to prepare a negative electrode.

After an electrode assembly was prepared by a typical method by stacking a polyolefin separator with the positive electrode and negative electrode thus prepared, and the electrolytes prepared in the examples and the comparative examples were respectively injected to complete the preparation of each lithium secondary battery.

Performance evaluation on the following items was performed on the prepared lithium secondary batteries.

2) Evaluation Items

A) High-Temperature Life Characteristics Evaluation

The lithium secondary batteries, in which the electrolytes of the examples and the comparative examples were used, were charged at 1.0 C/4.45 V to 4.45 V/112 mA under a constant current/constant voltage (CC/CV) condition at 45° C. and discharged at 1.0 C to a voltage of 3.0 V. This charge and discharge cycle was repeated 400 times and a capacity retention was calculated using Equation 1 below.

Capacity retention (%)=(discharge capacity after 400 cycles)/(initial discharge capacity)×100    [Equation 1]

B) High-Temperature Storage Characteristics Evaluation (a) Capacity Retention (%)

The lithium secondary batteries, in which the electrolytes of Examples 1a to 8a and Comparative examples 1a to 9a were used, were charged at 0.2 C/4.45 V to 4.45 V/112 mA under a constant current/constant voltage (CC/CV) condition at room temperature and discharged at 0.2 C to a voltage of 3.0 V to measure initial discharge capacity.

Thereafter, the secondary batteries were charged at 0.2 C/4.45 V to 4.45 V/112 mA under a constant current/constant voltage (CC/CV) condition at room temperature and then stored at 60° C. for 21 days. After the storage, the secondary batteries were charged at 0.2 C/4.45 V to 4.45 V/112 mA under a constant current/constant voltage (CC/CV) condition at room temperature and discharged at 0.2 C to a voltage of 3.0 V to measure discharge capacity after storage.

Capacity retention (%)=discharge capacity after 21 days storage (mAh)/initial discharge capacity (mAh) [Equation 2]

(b) Thickness Increase Rate

After the initial charge and discharge in experiment (a), each battery was set to a state of charge (SOC) of 50% to measure a thickness, and the thickness was defined as an initial thickness. A battery thickness, which was measured at 60° C. after high-temperature storage at a SOC of 100%, was defined as a final thickness, and a thickness increase rate (%) of the battery was calculated using the following Equation 3.

Thickness increase rate (%)=(final thickness initial thickness)/(initial thickness)×100(%) [Equation 3]

3) Evaluation Results

Performances of the lithium secondary batteries, in which the electrolytes of the examples and the comparative examples were used, were evaluated according to the above evaluation items, and the results thereof are presented in Table 2 below.

TABLE 2

| | Capacity retention (%) 45° C., 400 cycle | Capacity recovery rate (%) 60° C., 21 days | Thickness increase rate (%) 60° C., 21 days |
|---|---|---|---|
| Example 1a | 79.4 | 76.3 | 15.2 |
| Example 2a | 82.5 | 88.5 | 12.1 |
| Example 3a | 84.7 | 90.7 | 11.2 |
| Example 4a | 85.2 | 91.4 | 10.7 |
| Example 5a | 83.4 | 85.9 | 10.3 |
| Example 6a | 86.8 | 87.6 | 11.8 |
| Example 7a | 88.0 | 86.4 | 12.6 |
| Example 8a | 76.2 | 80.5 | 10.4 |
| Comparative Example 1a | 70.1 | 63.2 | 25.8 |
| Comparative Example 2a | 69.6 | — | vent[1] |
| Comparative Example 3a | 74.8 | 68.9 | 19.9 |
| Comparative Example 4a | 75.8 | 57.3 | 30.7 |
| Comparative Example 5a | 62.5 | 75.1 | 10.2 |
| Comparative Example 6a | 79.1 | — | vent |
| Comparative Example 7a | 72.5 | 59.8 | 33.1 |
| Comparative Example 8a | fading[2] | 88.6 | 11.8 |
| Comparative Example 9a | 68.1 | 87.1 | 12.2 |

[1]vent: a state in which evaluation was not possible because an increase in thickness of the battery was severe due to the generation of excessive amount of gas
[2]fading: a state in which further cycles were not possible due to battery degradation during charge and discharge cycles Referring to Table 2, it may be confirmed that Examples 1a to 8a, in which the borate-based lithium compound and the nitrile compound (succinonitrile) were mixed in a ratio of 1:0.5 to 1:6, were evaluated as excellent in terms of both high-temperature life characteristics and high-temperature storage characteristics in comparison to Comparative Examples 1a to 4a in which the nitrile compound was not used or the phosphate compounds were further used.

Specifically, with respect to Comparative Examples 1a and 2a in which the nitrile compound was not used, but the phosphate—compounds were respectively used with the borate-based lithium compound of Formula 1a, it may be confirmed that both life characteristics and storage characteristics at high temperature were quite poor, and, particularly, with respect to Comparative Example 2a, it may be confirmed that the battery was malfunctioned because the amount of gas generated was excessive.

Also, capacity retentions of Comparative Examples 3a and 4a, in which the nitrile compound was used, but the phosphate compounds were respectively further used, were relatively better than those of Comparative Examples 1a and 2a, but these capacity retentions were also significantly lower than those of the examples, and, particularly, since capacity recovery rates and thickness increase rates were poor, it may be confirmed that high-temperature storage characteristics were poor. From these results, it was confirmed that the phosphate compounds were not suitable as an electrolyte additive.

In addition, with respect to Comparative Example 5a, in which the compound of Formula 1a was only used, and Comparative Examples 6a and 7a in which the compound of Formula 1a was not used, since cycle performances at high temperature were poor or amounts of gas generated during high-temperature storage were excessive, it may be confirmed that the batteries were vented or increases in thickness were severe.

Also, with respect to Comparative Example 8a in which LiFSI was only used as the lithium salt, high-temperature life characteristics were poor, and, with respect to Comparative Example 9a in which the second lithium salt was only used, it may be confirmed that a level of high-temperature life characteristics was 15% or more lower than those of the examples.

Furthermore, with respect to Examples 1a to 8a according to the present specification, their effects were obtained by using the borate lithium compound of Formula 1a and the nitrile compound in a ratio of 1:0.5 to 1:6 based on the above data, but it may be confirmed that it was more desirable when the borate-based lithium compound of Formula 1a and the nitrile compound were used in a ratio of 1:1 to 1:5, and it was confirmed that, in a case in which the fluoroethylene carbonate was further used, the high-temperature life characteristics and the high-temperature storage characteristics may be further improved.

2. Borate-Based Lithium Compound and Non-Lithiated Additive 2

(1) Examples and Comparative Examples: Preparation of Electrolytes (Examples 1b to 7b and Comparative Examples 1b to 9b/Examples 1c to 7c and Comparative Examples 1c to 9c)

Electrolyte additive compositions were prepared by using materials and mixing weight ratios as listed in Tables 3 and 4 below.

Subsequently, 0.7 mole/l of LiFSI and 0.3 mole/l of LiPF$_6$ were added to a non-aqueous organic solvent having a composition, in which propylene carbonate (PC): ethyl propionate (EP): dimethyl carbonate (DMC)=2:4:4 (weight ratio), based on a total amount of a non-aqueous electrolyte solution, and the electrolyte additive compositions were added in amounts as listed in Tables 3 and 4 to prepare electrolytes of the examples and the comparative examples, respectively.

TABLE 3

| | Lithium salt | | Additive[1][2] | | | | | | |
| | LiFSI | LiBF$_6$ | Formula 1a | TVS | FEC | TBP | TMSP | Weight ratio | Total amount[1] |
|---|---|---|---|---|---|---|---|---|---|
| Example 1b | 0.7M | 0.3M | 1.0 | 0.05 | | | | 1:0.05 | 1.05 |
| Example 2b | 0.7M | 0.3M | 1.0 | 0.1 | | | | 1:0.1 | 1.1 |
| Example 3b | 0.7M | 0.3M | 1.0 | 0.2 | | | | 1:0.2 | 1.2 |
| Example 4b | 0.7M | 0.3M | 1.0 | 0.5 | | | | 1:0.5 | 1.5 |
| Example 5b | 0.7M | 0.3M | 1.0 | 1.0 | | | | 1:1 | 2.0 |
| Example 6b | 0.7M | 0.3M | 1.0 | 0.2 | 0.5 | | | 1:0.2:0.5 | 1.7 |
| Example 7b | 0.7M | 0.3M | 1.0 | 0.2 | 1.0 | | | 1:0.2:1 | 2.2 |
| Comparative Example 1b | 0.7M | 0.3M | 1.0 | — | | | | — | 1.0 |
| Comparative Example 2b | 0.7M | 0.3M | 1.0 | — | | 0.5 | | 1:0.5 | 1.5 |
| Comparative Example 3b | 0.7M | 0.3M | 1.0 | — | | | 0.5 | 1:0.5 | 1.5 |
| Comparative Example 4b | 0.7M | 0.3M | 1.0 | 0.2 | | 0.5 | | 1:0.2:0.5 | 1.7 |
| Comparative Example 5b | 0.7M | 0.3M | 1.0 | 0.2 | | | 0.5 | 1:0.2:0.5 | 1.7 |
| Comparative Example 6b | 0.7M | 0.3M | | 1.0 | 1.0 | | | — | 2.0 |
| Comparative Example 7b | 0.7M | 0.3M | | 1.0 | 0.5 | | | — | 1.5 |
| Comparative Example 8b | 1.0M | — | 1.0 | 1.0 | | | | 1:1 | 2.0 |
| Comparative Example 9b | — | 1.0M | 1.0 | 1.0 | | | | 1:1 | 2.0 |

[1] weight % based on a total weight of the electrolyte
[2] TVS: trivinyl silane/FEC: fluoroethylene carbonate/TBP: tributyl phosphate/TMSP: tris(trimethylsilyl) phosphate/Formula 1a was the same

TABLE 4

| | Lithium salt | | Additive[1][2] | | | | | | |
| | LiFSI | LiBF$_6$ | Formula 1a | TMS | FEC | TBP | TMSP | Weight ratio | Total amount[1] |
|---|---|---|---|---|---|---|---|---|---|
| Example 1c | 0.7M | 0.3M | 1.0 | 0.1 | | | | 1:0.1 | 1.1 |
| Example 2c | 0.7M | 0.3M | 1.0 | 0.5 | | | | 1:0.5 | 1.5 |
| Example 3c | 0.7M | 0.3M | 1.0 | 1.0 | | | | 1:1 | 2.0 |
| Example 4c | 0.7M | 0.3M | 1.0 | 1.5 | | | | 1:1.5 | 2.5 |
| Example 5c | 0.7M | 0.3M | 1.0 | 2.0 | | | | 1:2 | 3.0 |
| Example 6c | 0.7M | 0.3M | 1.0 | 0.5 | 0.5 | | | 1:0.5:0.5 | 2.0 |
| Example 7c | 0.7M | 0.3M | 1.0 | 0.5 | 1.0 | | | 1:0.5:1 | 2.5 |
| Comparative Example 1c | 0.7M | 0.3M | 1.0 | — | | | | — | 1.0 |
| Comparative Example 2c | 0.7M | 0.3M | 1.0 | — | | 0.5 | | 1:0.5 | 1.5 |
| Comparative Example 3c | 0.7M | 0.3M | 1.0 | — | | | 0.5 | 1:0.5 | 1.5 |
| Comparative Example 4c | 0.7M | 0.3M | 1.0 | 0.5 | | 0.5 | | 1:0.5:0.5 | 2.0 |
| Comparative Example 5c | 0.7M | 0.3M | 1.0 | 0.5 | | | 0.5 | 1:0.5:0.5 | 2.0 |
| Comparative Example 6c | 0.7M | 0.3M | | 1.0 | 1.0 | | | — | 2.0 |
| Comparative Example 7c | 0.7M | 0.3M | | 1.0 | 0.5 | | | — | 1.5 |
| Comparative Example 8c | 1.0M | — | 1.0 | 1.0 | | | | 1:1 | 2.0 |
| Comparative Example 9c | — | 1.0M | 1.0 | 1.0 | | | | 1:1 | 2.0 |

[1] weight % based on a total weight of the electrolyte
[2] TMS: trimethylene sulfate/FEC: fluoroethylene carbonate/TBP: tributyl phosphate/TMSP: tris(trimethylsilyl) phosphate/Formula 1a was the same (2) Experimental Example: Performance Evaluation of Lithium Secondary Battery 1) Preparation of Lithium Secondary Battery a mixture of 89 wt % of Li(Ni$_{0.33}$Co$_{0.33}$Mn$_{0.33}$)O$_2$ as a positive electrode active material, 8 wt % of carbon black as a conductive agent, and 3 wt % of polyvinylidene fluoride (PVDF), as a binder, were added to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry, dried, and then roll-pressed to prepare a positive electrode.

Also, 97 wt % of carbon powder as a negative electrode active material, 2 wt % of PVDF as a binder, and 1 wt % of carbon black, as a conductive agent, were added to NMP, as a solvent, to prepare a negative electrode mixture slurry. A 10 μm thick copper (Cu) thin film, as a negative electrode collector, was coated with the negative electrode mixture slurry, dried, and then roll-pressed to prepare a negative electrode.

After an electrode assembly was prepared by a typical method by stacking a polyolefin separator with the positive electrode and negative electrode thus prepared, and the electrolytes prepared in the examples and the comparative examples were respectively injected to complete the preparation of each lithium secondary battery.

Performance evaluation on the following items was performed on the prepared lithium secondary batteries.

2) Evaluation Items

1) High-Temperature Life Characteristics Evaluation

The lithium secondary batteries, in which the electrolytes of the examples and the comparative examples were used, were charged at 1.0 C/4.25 V to 4.25 V/55 mA under a constant current/constant voltage (CC/CV) condition at 45° C. and discharged at 1.0 C to a voltage of 3.0 V. This charge and discharge cycle was repeated 700 times and a capacity retention was calculated using Equation 1 below.

Capacity retention (%)=[discharge capacity after 700 cycles (mAh)]/[initial discharge capacity (mAh)]×100 [Equation 1]

2) High-Temperature Storage Characteristics Evaluation (a) Capacity Retention (%)

The lithium secondary batteries, in which the electrolytes of the examples and the comparative examples were used, were charged at 0.33 C/4.25 V to 4.25 V/55 mA under a constant current/constant voltage (CC/CV) condition at room temperature and discharged at 0.33 C to a voltage of 2.5 V to perform initial charge and discharge, and, thereafter, the secondary batteries were charged at 0.33 C/4.25 V to 4.25 V/55 mA under a constant current/constant voltage (CC/CV) condition at room temperature and then stored at 60° C. for 8 weeks. After the storage, the secondary batteries were charged at 0.33 C/4.25 V to 4.25 V/55 mA under a constant current/constant voltage (CC/CV) condition at room temperature and discharged at 0.33 C to a voltage of 2.5 V to measure capacity during discharge.

Capacity retention (%)=[discharge capacity after 8 weeks storage (mAh)]/[initial discharge capacity (mAh)]×100 [Equation 2]

(b) Thickness Increase Rate

After the initial charge and discharge in experiment (a), each battery was set to a state of charge (SOC) of 50% to measure a thickness, and the thickness was defined as an initial thickness. A battery thickness, which was measured at 60° C. after high-temperature storage at a SOC of 100%, was defined as a final thickness, and a thickness increase rate (%) of the battery was calculated using the following Equation 3.

Thickness increase rate (%)=(final thickness initial thickness)/(initial thickness)×100 [Equation 3]

(c) Resistance Increase Rate

After the initial charge and discharge in experiment (a), capacity was checked at room temperature, each battery was then charged to a SOC of 50% and discharged at a current of 3 C for 10 seconds to measure resistance by a voltage drop difference at this time, and the resistance was defined as initial resistance. After 8 weeks storage, resistance was measured in the same manner, the resistance was defined as final resistance, and a resistance increase rate was calculated using the following Equation 4.

Resistance increase rate (%)=(discharge resistance after 8 weeks initial discharge resistance)/(initial discharge resistance)×100 [Equation 4]

3) Evaluation Results

Performances of the lithium secondary batteries, in which the electrolytes of the examples and the comparative examples were used, were evaluated according to the above evaluation items, and the results thereof are presented in Tables 5 and 6 below.

A) Mixing with Silane Compound

TABLE 5

|  | Capacity retention (%) 45° C., 700 cycle | Capacity recovery rate (%) 60° C., 8 weeks | Thickness increase rate (%) 60° C., 8 weeks | Resistance increase rate (%) 60° C., 8 weeks |
| --- | --- | --- | --- | --- |
| Example 1b | 71.9 | 79.5 | 25.4 | 24.2 |
| Example 2b | 74.8 | 82.1 | 22.7 | 21.7 |
| Example 3b | 75.6 | 83.7 | 21.4 | 20.3 |
| Example 4b | 73.1 | 82.4 | 20.9 | 19.2 |
| Example 5b | 67.4 | 80.5 | 23.1 | 18.4 |
| Example 6b | 77.4 | 84.9 | 26.1 | 25.7 |
| Example 7b | 79.5 | 86.2 | 27.5 | 28.6 |
| Comparative Example 1b | 43.8 | 54.3 | 56.4 | 37.5 |
| Comparative Example 2b | 42.6 | 48.3 | 61.5 | 42.8 |
| Comparative Example 3b | fading | — | — | vent |
| Comparative Example 4b | 65.7 | 67.9 | 47.8 | 34.1 |
| Comparative Example 5b | fading | 54.5 | 59.7 | 43.8 |
| Comparative Example 6b | fading | 63.2 | 48.1 | 26.3 |
| Comparative Example 7b | fading | 53.4 | 56.6 | 33.7 |
| Comparative Example 8b | fading | 81.2 | 24.3 | 19.8 |
| Comparative Example 9b | 52.8 | 80.9 | 23.9 | 20.4 |

Referring to Table 5, it may be confirmed that Examples 1b to 7b, in which the borate-based lithium compound and the vinyl silane compound (trivinyl silane) were mixed in a ratio of 1:0.05 to 1:1, were evaluated as excellent in terms of both high-temperature life characteristics and high-temperature storage characteristics in comparison to Comparative Examples 1b to 5b in which the vinyl silane compound was not used or the phosphate compounds were further used.

Specifically, with respect to Comparative Examples 1b to 3b in which the vinyl silane compound was not used, or the phosphate compounds were further respectively used with the borate-based lithium compound of Formula 1a while the vinyl silane compound was not used, it may be confirmed that both life characteristics and storage characteristics at high temperature were quite poor. With respect to Comparative Examples 2b and 3b in which the phosphate compounds were further respectively used, it may be confirmed that capacity retentions were further deteriorated and resistances and thicknesses were significantly increased during high-temperature storage in comparison to Comparative Example 1b in which the vinyl silane compound was not used, and, particularly, with respect to Comparative Example 3b in which tris(trimethylsilyl) phosphate was used, it may be confirmed that measurement may not be performed because the battery was inoperable during both life characteristic and storage characteristic experiments.

Also, high-temperature life characteristics and storage characteristics of Comparative Examples 4b and 5b, in which the vinyl silane compound was used, but the phosphate compounds were further respectively used, were relatively better than those of Comparative Examples 1b and 2b, but levels of the life characteristics and storage characteristics were also significantly lower than those of the examples, and, particularly, with respect to Comparative Example 5b in which tris(trimethylsilyl) phosphate was used, it may be confirmed that the battery was inoperable during the life characteristic experiment and the storage characteristics were also poor. From these results, it was confirmed that the phosphate compounds were not suitable as an electrolyte additive.

In addition, with respect to Comparative Examples 6b and 7b in which the compound of Formula 1a was not used, the batteries were degraded during the cycles at high temperature, thicknesses and resistances were significantly increased because amounts of gas generated during high-temperature storage were excessive, and thus, it may be confirmed that performance degradation was severe.

Also, with respect to Comparative Examples 8b and 9b in which LiFSI was only used or the second lithium salt was only used, it may be understood that high-temperature life characteristics were considerably poor.

Furthermore, with respect to Examples 1b to 7b according to the present specification, their effects were obtained by using the borate lithium compound of Formula 1a and the vinyl silane compound in a ratio of 1:0.05 to 1:1 based on the above data, but it may be confirmed that it was more desirable when the borate-based lithium compound of Formula 1a and the vinyl silane compound were used in a ratio of 1:0.05 to 1:0.5, and it was confirmed that, in a case in which the fluoroethylene carbonate was further used, the high-temperature life characteristics and the high-temperature storage characteristics may be further improved.

TABLE 6

|  | Capacity retention (%) 45° C., 700 cycle | Capacity recovery rate (%) 60° C., 8 weeks | Thickness increase rate (%) 60° C., 8 weeks | Resistance increase rate (%) 60° C., 8 weeks |
| --- | --- | --- | --- | --- |
| Example 1c | 68.9 | 76.4 | 28.7 | 28.1 |
| Example 2c | 70.8 | 77.7 | 24.9 | 26.4 |
| Example 3c | 72.4 | 78.1 | 25.4 | 25.7 |
| Example 4c | 71.1 | 74.6 | 24.1 | 25.9 |
| Example 5c | 65.5 | 72.6 | 26.1 | 26.3 |
| Example 6c | 74.6 | 78.4 | 29.3 | 29.2 |
| Example 7c | 75.2 | 79.8 | 31.6 | 30.9 |
| Comparative Example 1c | 43.8 | 54.3 | 56.4 | 37.5 |
| Comparative Example 2c | 42.6 | 48.3 | 61.5 | 42.8 |
| Comparative Example 3c | fading | — | — | vent |
| Comparative Example 4c | 60.9 | 62.1 | 52.7 | 38.4 |
| Comparative Example 5c | fading | — | — | vent |
| Comparative Example 6c | 51.3 | — | — | vent |
| Comparative Example 7c | fading | — | — | vent |
| Comparative Example 8c | fading | 78.0 | 29.8 | 27.4 |
| Comparative Example 9c | 57.6 | 75.3 | 28.2 | 29.0 |

Referring to Table 6, it may be confirmed that Examples 1c to 7c, in which the borate-based lithium compound and the sulfate compound (trimethylene sulfate) were mixed in a ratio of 1:0.1 to 1:2, were evaluated as excellent in terms of both high-temperature life characteristics and high-temperature storage characteristics in comparison to Comparative Examples 1c to 5c in which the sulfate compound was not used or the phosphate compounds were further respectively used.

Specifically, with respect to Comparative Examples 1c to 3c in which the sulfate compound was not used, or the phosphate compounds were further respectively used with the borate-based lithium compound of Formula 1a while the sulfate compound was not used, it may be confirmed that both life characteristics and storage characteristics at high temperature were quite poor. With respect to Comparative Examples 2c and 3c in which the phosphate compounds were further respectively used, it may be confirmed that capacity retentions were somewhat deteriorated in comparison to Comparative Example 1c in which the sulfate-compound was not used and, particularly, the performance of the batteries was significantly degraded because resistances and thicknesses were significantly increased during high-temperature storage. In particular, with respect to Comparative Example 3c in which tris(trimethylsilyl) phosphate was used, it may be confirmed that measurement may not be performed because the battery was inoperable during both life characteristic and storage characteristic experiments.

Also, with respect to Comparative Examples 4c and 5c in which the sulfate compound was used, but the phosphate compounds were further respectively used, performance levels were significantly lower than those of the examples, and, particularly, with respect to Comparative Example 5c in which tris(trimethylsilyl) phosphate was used, it may be confirmed that measurement may not be performed because the battery was inoperable during both life characteristic and storage characteristic experiments. From these results, it was confirmed that the phosphate compounds were not suitable as an electrolyte additive.

In addition, with respect to Comparative Examples 6c and 7c in which the compound of Formula 1a was not used, it may be confirmed that performances were very poor, for example, the batteries were inoperable during the experiment because cycle performances at high temperature were poor, or the batteries were vented because the amounts of gas generated during high-temperature storage were excessive.

Also, with respect to Comparative Examples 8c and 9c in which LiFSI was only used or the second lithium salt was only used, it may be understood that high-temperature life characteristics were considerably poor.

Subsequently, 0.7 mole/l of LiFSI and 0.3 mole/l of $LiPF_6$ were added to a non-aqueous organic solvent having a composition, in which propylene carbonate (PC): ethyl propionate (EP): dimethyl carbonate (DMC)=2:4:4 (weight ratio), based on a total amount of a non-aqueous electrolyte solution, and the electrolyte additive compositions were added in amounts as listed in Table 7 to prepare electrolytes of the examples and the comparative examples, respectively.

TABLE 7

| | Lithium salt | | Additive[1)2)] | | | | | | | | |
|---|---|---|---|---|---|---|---|---|---|---|---|
| | | | Formula | | | | | | | Weight | Total |
| | LiFSI | $LiBF_6$ | 1a | LiODFB | LiDFP | LiBOB | $LiBF_4$ | TBP | TMSP | ratio | amount[1)] |
| Example 1d | 0.7M | 0.3M | 1.0 | 0.1 | | | | | | 1:0.1 | 1.1 |
| Example 2d | 0.7M | 0.3M | 1.0 | | 0.1 | | | | | 1:0.1 | 1.1 |
| Example 3d | 0.7M | 0.3M | 1.0 | 0.3 | | | | | | 1:0.3 | 1.3 |
| Example 4d | 0.7M | 0.3M | 1.0 | | 0.3 | | | | | 1:0.3 | 1.3 |
| Example 5d | 0.7M | 0.3M | 1.0 | 0.5 | | | | | | 1:0.5 | 1.5 |
| Example 6d | 0.7M | 0.3M | 1.0 | | 0.5 | | | | | 1:0.5 | 1.5 |
| Example 7d | 0.7M | 0.3M | 1.0 | | | 0.5 | | | | 1:0.5 | 1.5 |
| Example 8d | 0.7M | 0.3M | 1.0 | | | | 0.5 | | | 1:0.5 | 1.5 |
| Example 9d | 0.7M | 0.3M | 1.0 | 1.0 | | | | | | 1:1 | 2.0 |
| Example 10d | 0.7M | 0.3M | 1.0 | | 1.0 | | | | | 1:1 | 2.0 |
| Example 11d | 0.7M | 0.3M | 1.0 | 1.5 | | | | | | 1:1.5 | 2.5 |
| Example 12d | 0.7M | 0.3M | 1.0 | | 1.5 | | | | | 1:1.5 | 2.5 |
| Comparative Example 1d | 0.7M | 0.3M | 1.0 | — | | | | | | — | 1.0 |
| Comparative Example 2d | 0.7M | 0.3M | — | 1.0 | | | | | | — | 1.0 |
| Comparative Example 3d | 0.7M | 0.3M | — | | 1.0 | | | | | — | 1.0 |
| Comparative Example 4d | 0.7M | 0.3M | 1.0 | — | | | | 0.5 | | — | 1.0 |
| Comparative Example 5d | 0.7M | 0.3M | 1.0 | — | | | | | 0.5 | — | 1.0 |
| Comparative Example 6d | 0.7M | 0.3M | 1.0 | 0.5 | | | | 0.5 | | 1:0.5 | 1.5 |
| Comparative Example 7d | 0.7M | 0.3M | 1.0 | 0.5 | | | | | 0.5 | 1:0.5 | 1.5 |
| Comparative Example 8d | 0.7M | 0.3M | 1.0 | | 0.5 | | | 0.5 | | 1:0.5:0.5 | 2 |
| Comparative Example 9d | 0.7M | 0.3M | 1.0 | | 0.5 | | | | 0.5 | 1:0.5:0.5 | 2 |
| Comparative Example 10d | 1.0M | — | 1.0 | | | | | | | 1:0.5:0.5 | 2 |
| Comparative Example 11d | — | 1.0M | 1.0 | | | | | | | 1:0.5:0.5 | 2 |

[1)]weight % based on a total weight of the electrolyte
[2)]LiODFB: lithium difluoro(oxalato)borate/LiDFP: lithium difluoro phosphate/LiBOB: lithium bis(oxalato)borate/$LiBF_4$: lithium tetrafluoro borate/TBP: tributyl phosphate/TMSP: tris(trimethylsilyl) phosphate Furthermore, with respect to Examples 1c to 7c according to the present specification, their effects were obtained by using the borate-based lithium compound of Formula 1a and the sulfate compound in a ratio of 1:0.1 to 1:2 based on the above data, but it may be confirmed that it was more desirable when the borate-based lithium compound of Formula 1a and the sulfate compound were used in a ratio of 1:0.1 to 1:1.5, and it was confirmed that, in a case in which the fluoroethylene carbonate was further used, the high-temperature life characteristics and the high-temperature storage characteristics may be further improved.

3. Borate-Based Lithium Compound and Lithiated Additive (1) Examples and Comparative Examples: Preparation of Electrolytes (Examples 1d to 12d and Comparative Examples 1d to 11d)

Electrolyte additive compositions were prepared by using materials and mixing weight ratios as listed in Table 7 below.

(2) Experimental Example: Performance Evaluation of Lithium Secondary Battery

1) Preparation of Lithium Secondary Battery

Lithium secondary batteries were prepared in the same manner as in "2. Borate-based Lithium Compound and Non-lithiated Additive 2", and the electrolytes of the examples and the comparative examples were then respectively injected to complete the preparation of each lithium secondary battery.

Performance evaluation on the following items was performed on the prepared lithium secondary batteries.

2) Evaluation Items

Evaluation was performed on the same evaluation items as in "2. Borate-based Lithium Compound and Non-lithiated Additive 2" by the same measurement method.

3) Evaluation Results

Performances of the lithium secondary batteries, in which the electrolytes of the examples and the comparative examples were used, were evaluated according to the above evaluation items, and the results thereof are presented in Table 8 below.

TABLE 8

| | Capacity retention (%) 45° C., 700 cycle | Capacity recovery rate (%) 60° C., 8 weeks | Thickness increase rate (%) 60° C., 8 weeks | Resistance increase rate (%) 60° C., 8 weeks |
|---|---|---|---|---|
| Example 1d | 74.8 | 77.6 | 25.2 | 28 |
| Example 2d | 74.8 | 78.7 | 21.4 | 24.1 |
| Example 3d | 76.6 | 80.2 | 22.7 | 28.7 |
| Example 4d | 76.9 | 81.3 | 19.2 | 23.9 |
| Example 5d | 78.1 | 81.8 | 21.4 | 30.1 |
| Example 6d | 78.4 | 82.9 | 18.7 | 22.7 |
| Example 7d | 77.2 | 80.7 | 22.7 | 29.5 |
| Example 8d | 70.6 | 75.4 | 29.7 | 34.9 |
| Example 9d | 75.3 | 78.1 | 20.3 | 32.4 |
| Example 10d | 75.6 | 79.2 | 19.5 | 24.4 |
| Example 11d | 70.2 | 74.6 | 46.7 | 48.8 |
| Example 12d | 72.2 | 76.4 | 34.4 | 28.7 |
| Comparative Example 1d | 43.8 | 54.3 | 56.4 | 37.5 |
| Comparative Example 2d | 63.4 | — | — | vent |
| Comparative Example 3d | 59.8 | 61.6 | 72.3 | 38.1 |
| Comparative Example 4d | 42.6 | 48.3 | 61.5 | 42.8 |
| Comparative Example 5d | fading | — | — | vent |
| Comparative Example 6d | 68.2 | 66 | 58.6 | 41.9 |
| Comparative Example 7d | 54.5 | 52.6 | 69.3 | 50.6 |
| Comparative Example 8d | 67.2 | 67.3 | 47.3 | 36.7 |
| Comparative Example 9d | 56.4 | 53.6 | 56.4 | 45.9 |
| Comparative Example 10d | fading | 54.1 | 61.2 | 39.4 |
| Comparative Example 11d | 42.5 | 53.6 | 59.3 | 41.0 |

Referring to Table 8, it may be confirmed that Examples 1d to 12d, in which the borate-based lithium compound and the lithiated additive were mixed in a ratio of 1:0.1 to 1:1.5, were evaluated as excellent in terms of both high-temperature life characteristics and high-temperature storage characteristics in comparison to the comparative examples in which the lithiated additive was not added (Comparative Example 1d), the lithiated additive was not added and the non-lithiated phosphate compound was further used (Comparative Examples 4d and 5d), and the lithiated additive was added but the non-lithiated phosphate compound was also further used (Comparative Examples 6d to 9d).

Specifically, with respect to Comparative Examples 1d, 4d, and 5d in which the lithiated additive was not used, or the non-lithiated phosphate compounds were further respectively used with the borate-based lithium compound of Formula 1a while the lithiated additive was not used, it may be confirmed that both life characteristics and storage characteristics at high temperature were quite poor. With respect to Comparative Examples 4d and 5d in which the non-lithiated phosphate compounds were further respectively used, it may be confirmed that capacity retentions were further deteriorated and resistances and thicknesses were significantly increased during high-temperature storage in comparison to Comparative Example 1d in which the lithiated additive was not used, and, particularly, with respect to Comparative Example 5d in which tris(trimethylsilyl) phosphate was used, it may be confirmed that measurement may not be performed because the battery was inoperable during both life characteristic and storage characteristic experiments.

Also, high-temperature life characteristics and storage characteristics of Comparative Examples 6d to 9d, in which the lithiated additive was used, but the non-lithiated phosphate compounds were further respectively used, were relatively better than those of Comparative Examples 1d and 4d, but levels of the life characteristics and storage characteristics were also significantly lower than those of Examples 1d to 12d, and, particularly, with respect to Comparative Examples 7d and 9d in which tris(trimethylsilyl) phosphate was used, it may be confirmed that their characteristics were more degraded. From these results, it was confirmed that the non-lithiated phosphate compounds were not suitable as an electrolyte additive.

In addition, with respect to Comparative Examples 2d and 3d in which the compound of Formula 1a was not used, it was noticeable that high-temperature cycle characteristics were poor, and the battery became unable to be evaluated during high-temperature storage in Comparative Example 2d. With respect to Comparative Example 3d, thickness and resistance were significantly increased because the amount of gas generated during high-temperature storage was excessive, and thus, it may be confirmed that performance degradation was severe.

Also, with respect to Comparative Examples 10d and 11d in which LiFSI was only used or the second lithium salt was only used, it may be understood that high-temperature life characteristics were considerably poor.

Furthermore, with respect to Examples 1d to 12d according to the present specification, their effects were obtained by using the borate-based lithium compound of Formula 1a and the lithiated additive in a ratio of 1:0.1 to 1:1.5 based on the above data, but it may be confirmed that it was more desirable when the borate-based lithium compound of Formula 1a and the lithiated additive were used in a ratio of 1:0.1 to 1:1, and, additionally, regarding the types of the lithiated additive, it was confirmed that the examples, in which the boron oxalate-based lithium (LiODFB and LiBOB) or the phosphate-based lithium (LiDFP) was used, were more preferable to improve the high-temperature life characteristics and the high-temperature storage characteristics than Example 8d in which LiBF$_4$ was used.

4. Borate-Based Lithium Compound, Non-Lithiated Additive, and Lithiated Additive (1) Examples and Comparative Examples: Preparation of Electrolytes (Examples 1e to 8e)

Electrolyte additive compositions were prepared by using materials and mixing weight ratios as listed in Table 9 below.

Subsequently, 0.7 mole/l of LiFSI and 0.3 mole/l of LiPF$_6$ were added to a non-aqueous organic solvent having a composition, in which propylene carbonate (PC): ethyl propionate (EP): dimethyl carbonate (DMC)=2:4:4 (weight ratio), based on a total amount of a non-aqueous electrolyte solution, and the electrolyte additive compositions were added in amounts as listed in Table 9 to prepare electrolytes of the examples, respectively.

TABLE 9

| | Lithium salt | | Additive[1)2)] | | | | | | Weight ratio | Total amount[1)] |
|---|---|---|---|---|---|---|---|---|---|---|
| | LiFSI | LiBF$_6$ | Formula 1a | SN | LiODFB | FEC | LiBF$_4$ | LiDFP | | |
| Example 1e | 0.7M | 0.3M | 1.0 | 0.1 | 0.1 | | | | 1:0.1:0.1 | 1.2 |
| Example 2e | 0.7M | 0.3M | 1.0 | 0.5 | 0.5 | | | | 1:0.5:0.5 | 2.0 |
| Example 3e | 0.7M | 0.3M | 1.0 | 1.0 | 0.5 | | | | 1:1:0.5 | 2.5 |
| Example 4e | 0.7M | 0.3M | 1.0 | 1.5 | 1.0 | | | | 1:1.5:1.0 | 3.5 |
| Example 5e | 0.7M | 0.3M | 1.0 | 1.0 | 0.5 | 0.5 | | | 1:1:0.5:0.5 | 3.0 |
| Example 6e | 0.7M | 0.3M | 1.0 | 1.0 | 0.5 | 1.0 | | | 1:1:0.5:1 | 3.5 |
| Example 7e | 0.7M | 0.3M | 1.0 | 1.0 | | | 0.5 | | 1:1:0.5 | 2.5 |
| Example 8e | 0.7M | 0.3M | 1.0 | 1.0 | | | | 0.5 | 1:1:0.5 | 2.5 |

[1)]weight % based on a total weight of the electrolyte
[2)](the same as those in the above-described Table)

(2) Experimental Example: Performance Evaluation of Lithium Secondary Battery

1) Preparation of Lithium Secondary Battery

Lithium secondary batteries were prepared in the same manner as in "2. Borate-based Lithium Compound and Non-lithiated Additive 2", and the electrolytes of the examples were then respectively injected to complete the preparation of each lithium secondary battery.

Performance evaluation on the following items was performed on the prepared lithium secondary batteries.

2) Evaluation Items

Evaluation was performed on the same evaluation items as in "2. Borate-based Lithium Compound and Non-lithiated Additive 2" by the same measurement method.

3) Evaluation Results

Performances of the lithium secondary batteries, in which the electrolytes of the examples were used, were evaluated according to the above evaluation items, and the results thereof are presented in Table 10 below.

TABLE 10

| | Capacity retention (%) 45° C., 700 cycle | Capacity recovery rate (%) 60° C., 8 weeks | Thickness increase rate (%) 60° C., 8 weeks | Resistance increase rate (%) 60° C., 8 weeks |
|---|---|---|---|---|
| Example 1e | 78.7 | 82.6 | 20.6 | 22.4 |
| Example 2e | 81.1 | 87 | 17.9 | 21.1 |
| Example 3e | 81.6 | 87.8 | 15.4 | 20.6 |
| Example 4e | 83.8 | 86.4 | 15.8 | 21.7 |
| Example 5e | 84 | 88.6 | 18.6 | 25 |
| Example 6e | 85.3 | 89.2 | 20 | 26.4 |
| Example 7e | 81 | 87.6 | 14.6 | 23.1 |
| Example 8e | 82.6 | 88.8 | 14.1 | 22.2 |

Referring to Table 10, it may be confirmed that better effects on the high-temperature life characteristics and the high-temperature storage characteristics may be achieved by using the borate-based lithium compound, the lithiated additive, and the non-lithiated additive with LiFSI. That is, when a case (2) of adding the non-lithiated additive and a case of adding the lithiated additive, which were subjected to the same evaluation, were compared, it may be confirmed that overall performance was improved by about 10% or more.

The invention claimed is:

1. An electrolyte for a lithium secondary battery, comprising:
   a lithium salt including lithium bis(fluorosulfonyl)imide (LiFSI) and a second lithium salt;
   an additive composition including a borate lithium compound and a second additive; and
   a non-aqueous organic solvent,
   wherein the second additive comprises at least one of a lithiated additive or a non-lithiated additive,
   wherein the non-lithiated additive consists of at least one of a carbonate compound, a silane compound, a sulfate compound, a sulfite compound, a sulfone-based compound, a nitrile compound, and a fluorobenzene compound;
   wherein the additive composition does not contain a non-lithiated phosphate compound, and
   wherein the borate lithium compound is represented by Formula 1:

[Formula 1]

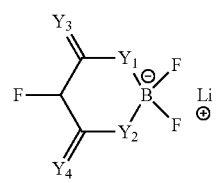

wherein, in Formula 1, $Y_1$ to $Y_4$ are each independently oxygen (O) or sulfur (S).

2. The electrolyte for a lithium secondary battery of claim 1, wherein the borate lithium compound comprises a compound represented by Formula 1a:

[Formula 1a]

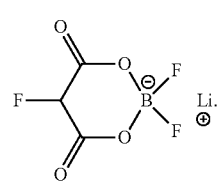

3. The electrolyte for a lithium secondary battery of claim 1, wherein the second lithium salt comprises at least one of LiPF$_6$, LiAsF$_6$, LiCF$_3$SO$_3$, LiBF$_6$, LiSbF$_6$, LiN(C$_2$F$_5$SO$_2$)$_2$, LiAlO$_4$, LiAlCl$_4$, LiSO$_3$CF$_3$, or LiClO$_4$.

4. The electrolyte for a lithium secondary battery of claim 1, wherein a molar ratio of the lithium bis(fluorosulfonyl) imide (LiFSI) to the second lithium salt is in a range of 1:0.01 to 1:9.

5. The electrolyte for a lithium secondary battery of claim 1, wherein the lithiated additive comprises at least one of boron-based lithium, imidazole-based lithium, phosphate-based lithium, and sulfate-based lithium.

6. The electrolyte for a lithium secondary battery of claim 1, wherein the lithiated additive comprises at least one of boron-based lithium or phosphate-based lithium.

7. The electrolyte for a lithium secondary battery of claim 1, wherein a weight ratio of the borate lithium compound represented by Formula 1 to the second lithium salt in the additive composition is in a range of 1:0.01 to 1:5.

8. The electrolyte for a lithium secondary battery of claim 1, wherein the additive composition further comprises fluoroethylene carbonate.

9. The electrolyte for a lithium secondary battery of claim 1, wherein the borate lithium compound represented by Formula 1 is included in an amount of 0.01 wt % to 10 wt % based on a total weight of the electrolyte.

10. A lithium secondary battery comprising the electrolyte of claim 1, a positive electrode, a negative electrode, and a separator disposed between the positive electrode and the negative electrode.

\* \* \* \* \*